(12) United States Patent
Fazeli et al.

(10) Patent No.: US 9,285,007 B2
(45) Date of Patent: Mar. 15, 2016

(54) SERVICING MONITORING SYSTEM FOR MIXED FLUID-GAS SHOCK STRUTS

(71) Applicant: Goodrich Corporation, Charlotte, NC (US)

(72) Inventors: Amir M. Fazeli, Milton (CA); Adnan Cepic, Mississauga (CA); Susanne M. Reber, Middleburg Heights, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/318,055

(22) Filed: Jun. 27, 2014

(65) Prior Publication Data

US 2015/0267769 A1    Sep. 24, 2015

Related U.S. Application Data

(60) Provisional application No. 61/968,462, filed on Mar. 21, 2014.

(51) Int. Cl.
| F16F 9/32 | (2006.01) |
| G07C 5/08 | (2006.01) |
| G01M 17/04 | (2006.01) |
| G01L 7/00 | (2006.01) |
| G01K 13/02 | (2006.01) |
| G01F 22/02 | (2006.01) |
| B64F 5/00 | (2006.01) |
| B64C 25/60 | (2006.01) |
| B64D 45/00 | (2006.01) |

(52) U.S. Cl.
CPC .............. *F16F 9/3264* (2013.01); *B64F 5/0045* (2013.01); *F16F 9/3292* (2013.01); *G01F 22/02* (2013.01); *G01K 13/02* (2013.01); *G01L 7/00* (2013.01); *G01M 17/04* (2013.01); *G07C 5/085* (2013.01); *G07C 5/0808* (2013.01); *G07C 5/0816* (2013.01); *B64C 25/60* (2013.01); *B64D 2045/008* (2013.01); *F16F 2230/24* (2013.01); *F16F 2230/46* (2013.01); *G01K 2013/024* (2013.01)

(58) Field of Classification Search
None
See application file for complete search history.

(56) References Cited

U.S. PATENT DOCUMENTS

| 6,032,090 | A | 2/2000 | von Bose | |
| 6,293,141 | B1 | 9/2001 | Nance | |
| 7,274,310 | B1 * | 9/2007 | Nance | 340/960 |
| 7,552,803 | B2 | 6/2009 | Luce | |
| 7,650,210 | B2 | 1/2010 | Breed | |
| 7,716,964 | B2 | 5/2010 | Kurtz et al. | |
| 7,845,220 | B2 * | 12/2010 | Schmidt et al. | 73/170.02 |
| 8,042,765 | B1 | 10/2011 | Nance | |
| 8,055,396 | B2 | 11/2011 | Yates et al. | |
| 8,262,019 | B2 | 9/2012 | Schmidt et al. | |

(Continued)

FOREIGN PATENT DOCUMENTS

| EP | 2921403 A1 | 9/2015 |
| WO | 2014184521 A1 | 11/2014 |

*Primary Examiner* — Yonel Beaulieu
*Assistant Examiner* — Krishnan Ramesh
(74) *Attorney, Agent, or Firm* — Kinney & Lange, P.A.

(57) ABSTRACT

A method and system of monitoring condition of a shock strut senses gas temperature, gas pressure, and stroke of the strut during a landing event. Oil loss is determined based upon a deviation of a transient pressure coefficient derived from transient gas pressures at two different strokes from a nominal coefficient value. Gas loss is determined based upon a temperature adjusted transient gas pressure at a selected stroke and a nominal gas pressure value at the selected stroke.

15 Claims, 2 Drawing Sheets

(56) References Cited

U.S. PATENT DOCUMENTS

| | | |
|---|---|---|
| 8,275,515 B2 | 9/2012 | Wright et al. |
| 8,446,294 B2 | 5/2013 | Schmidt |
| 8,528,400 B2 | 9/2013 | Luce |
| 8,565,965 B2 | 10/2013 | Nance |
| 8,565,968 B2 | 10/2013 | Nance |
| 8,712,634 B2 | 4/2014 | Followell et al. |
| 8,903,572 B1 | 12/2014 | Hagelin et al. |
| 9,045,237 B2 | 6/2015 | Nance |
| 2004/0129834 A1* | 7/2004 | Luce .................. 244/100 R |
| 2007/0069072 A1* | 3/2007 | Luce .................. 244/104 FP |
| 2008/0033607 A1 | 2/2008 | Zeliff et al. |
| 2008/0163668 A1* | 7/2008 | Kurtz et al. .................. 73/11.04 |
| 2010/0017052 A1* | 1/2010 | Luce .................. 701/16 |
| 2010/0121504 A1* | 5/2010 | Jones et al. .................. 701/16 |
| 2012/0053783 A1* | 3/2012 | Nance .................. 701/33.1 |
| 2014/0046533 A1* | 2/2014 | Nance .................. 701/33.7 |
| 2014/0312171 A1 | 10/2014 | Schmidt |
| 2015/0101403 A1* | 4/2015 | Shepherd et al. .................. 73/149 |
| 2015/0154819 A1 | 6/2015 | Wilson et al. |
| 2015/0166195 A1 | 6/2015 | Wilson et al. |
| 2015/0269794 A1 | 9/2015 | Fazeli et al. |

* cited by examiner

SERVICING MONITORING SYSTEM FOR MIXED FLUID-GAS SHOCK STRUTS

CROSS-REFERENCE TO RELATED APPLICATION(S)

This application claims priority to U.S. Provisional Application Ser. No. 61/968,462, entitled "SERVICING MONITORING ALGORITHM FOR MIXED FLUID-GAS LANDING GEAR SHOCK STRUTS" filed Mar. 21, 2014, which is incorporated by reference.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common and necessary component in most aircraft landing gear assemblies. The shock struts used in the landing gear of aircraft generally are subject to more demanding performance requirements than most if not all ground vehicle shock absorbers. In particular, shock struts must control motion of the landing gear, and absorb and damp loads imposed on the gear during landing, taxiing and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas (nitrogen or air) is compressed as the shock strut is axially compressed, and a volume of oil is metered through an orifice. The gas acts as an energy storage device, such as a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Over time the gas and/or oil may leak from the telescoping cylinders and cause a change in the performance characteristics of the strut. While gas pressure can be readily monitored, it cannot be readily determined if a loss in gas pressure arose from leakage of gas alone or from leakage of both gas and oil, unless external evidence of an oil leak is noticed by maintenance personnel. If a low pressure condition is detected in the absence of external evidence of an oil leak, maintenance personnel heretofore would restore the gas pressure to a prescribed level by adding gas. This, however, eventually leads to degraded performance of the shock strut if oil had indeed escaped from the strut. Even if evidence of a oil leak is observed, maintenance personnel cannot easily determine how much oil remains or whether the remaining amount of oil meets specifications or is acceptable for operation.

Functionality and performance of a landing gear shock strut depends on its gas pressure and oil volume. To ensure that the landing gear functionality is within an accepted range, gas pressure and oil volume should be maintained within the design envelope. In the past, static measurement of gas pressure was the basis for shock strut servicing.

SUMMARY

A method of monitoring servicing condition of a shock strut, the method comprises sensing gas temperature, gas pressure, and stroke of the shock strut during a landing event. Oil loss is determined based upon a deviation of transient pressure coefficient derived from transient gas pressures at two different strokes from a nominal coefficient value. Gas loss is determined based upon temperature adjusted transient gas pressure at a selected stroke and a nominal gas pressure value at the selected stroke. An output is provided that indicates need for service of the shock strut based upon the oil loss and the gas loss.

A system for monitoring servicing condition of a shock strut includes a gas temperature sensor, a gas pressure sensor, a stroke sensor, and a digital processor that determines whether the shock strut needs servicing. The digital processor includes a recorder, a landing detector, and a health monitor. The recorder acquires sensed gas temperature, gas pressure, and stroke data over time and stores the data in a data array. The landing detector determines occurrence of a landing event based upon stroke data in the data array. The health monitor determines oil loss and gas loss based upon the gas temperature, gas pressure, and stroke data from the data array during the landing event. The health monitor determines oil loss based upon a transient pressure coefficient derived from transient pressure data at two different strokes and the sensed gas temperature. The health monitor determines gas loss based on gas pressure at a selected stroke, the sensed gas temperature, and an expected gas pressure value at the selected stroke.

DETAILED DESCRIPTION

In current practice during pre/post flight maintenance, shock strut gas pressure and stroke in a static condition are measured, and any deviation from a shock strut theoretical static airspring curve is typically compensated by re-servicing the shock strut with gas. This approach is taken due to the reduced maintenance time associated with just adding gas to the shock strut. There are several issues with this method. First, investigations have shown that the shock strut steady state gas pressure depends on its operating conditions such as compression rate during landing, oil saturation state at fully extended position, and the stroke at which servicing is performed. As a result, depending on the servicing inspection conditions, a properly serviced shock strut with nominal amounts of gas pressure and oil volume may not follow the theoretical static airspring curve. Second, in the absence of visual oil leakage signs, the current practice assumes the deviation from static airspring curve is due to gas loss and therefore could overlook an oil leak in the system.

A monitoring system and method is presented in which the transient gas pressure during landing at two strokes is used to detect and quantify the deviation of shock strut gas pressure and oil volume from the nominal values. A servicing algorithm is performed by the monitoring system, based upon the following parameters that are recorded at 100 Hz (or faster) continuously: (1) Gas pressure, (2) Gas temperature, and (3) Shock strut stroke. Using these parameters, oil loss (requiring servicing of both oil and gas) and gas loss (requiring servicing of gas) are determined and reported.

Figure 1:
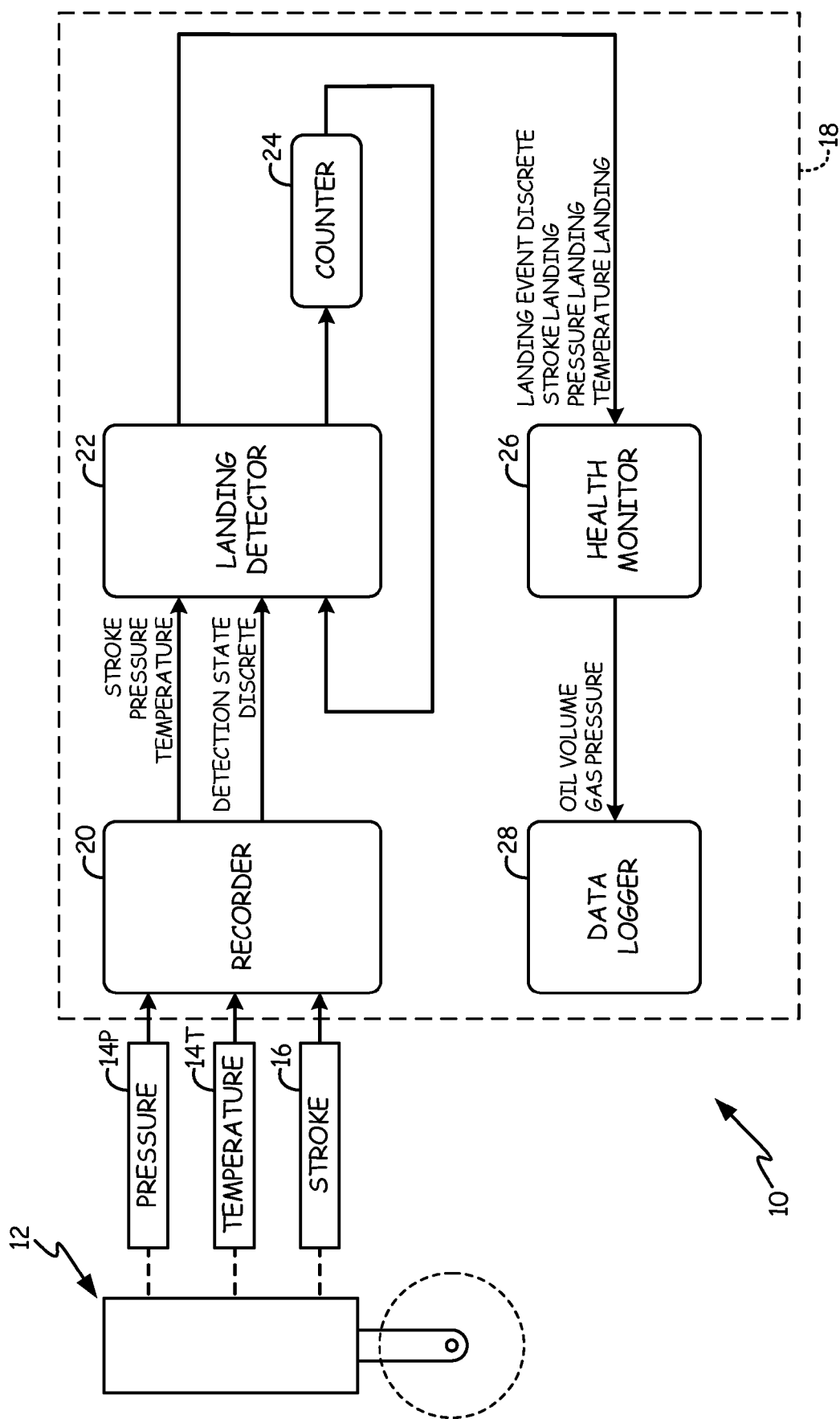
FIG. 1 is a block diagram of a monitoring system for determining oil volume and gas pressure in a shock struck based upon transient gas pressure/temperature measurements.

FIG. 1 shows a block diagram of monitoring system 10. Unlike the current practice, system 10 uses the transient gas pressure and temperature during landing event and quantifies the oil volume and gas pressure in shock strut 12. Since the oil volume and gas pressure are determined independently, they can be used for diagnostic and prognostic purposes. The rate of oil loss or gas loss can be used to schedule the shock strut for servicing in the future. In addition, system 10 can be applied to any mixed fluid-gas shock strut.

System 10 includes pressure sensor 14P, temperature sensor 14T, and stroke sensor 16 mounted on shock strut 12, and digital processor 18. Pressure sensor 14P and temperature sensor 14T can be in the form of individual sensors or can be in the form of a combined pressure/temperature sensor. The servicing algorithm executed by processor 18 comprises the following sub-algorithms: recorder 20, landing detector 22, counter 24, health monitor 26, and data logger 28.

Recorder 20 acquires the gas pressure and temperature parameters from pressure-temperature sensor 14 and the stroke parameter from stroke sensor 16. Recorder 20 records the three parameters in an array or circular buffer that keeps the readings for a set period of time, for instance 15 seconds. New set of recordings is added to top of the array and the oldest set of data is eliminated from the bottom of the array to keep the length of the array equivalent to 15 seconds of data. At any instant, recorder 20 exports the array which comprises the latest 15 seconds of data to landing detector 22. At startup, when the length of the array is not equivalent to 15 seconds, recorder 20 sends a "false" detection state discrete signal to landing detector 22, so that landing detector 22 avoids using data from an incomplete array. Once 15 seconds of measurements is available in the array, the detection state discrete signal turns into "true" and allows landing detector 22 to use the measurements.

Once landing detector 22 receives the array of data, it checks the array against the following set of criteria:
 (1) minimum stroke in the array is smaller than 0.2 inches (a selectable parameter),
 (2) maximum stroke in the array is bigger than 10 inches (a selectable parameter),
 (3) stroke for the first five (5) seconds of the array is less than 0.2 inches (a selectable parameter), and
 (4) maximum stroke in the first ten (10) seconds of the array is bigger than 9 inches (a selectable parameter).

The first two criteria ensure that the set of data is associated to a landing, or a takeoff, or any other event that has caused shock strut 12 to travel between 0.2 inches to 10 inches. The third criterion ensures that the set of data is associated with a landing event, because in the first five (5) seconds the shock strut has been fully extended. The fourth criterion ensures that the chosen set of data also includes five (5) seconds of measurement after compression. If the data array meets all these criteria, it is categorized as a landing event and exported to the health monitor 26. Counter 24 is also started to prevent landing detector 22 from receiving any new array for five (5) minutes (a selectable parameter). This relaxes the need for a high speed processor as data acquisition and health monitoring will not be performed simultaneously. If the data array does not meet all the criteria, landing detector 22 disregards the array and waits for the new array of data.

Health monitor 26 requires real-time measurement of gas pressure, temperature and shock strut stroke during a landing event. Health monitor 26 determines oil loss using an oil level algorithm and gas loss using a gas level algorithm.

An oil level algorithm determines the oil volume within strut 12 by first using the transient gas pressure at two predetermined strokes during landing to calculate a transient pressure coefficient, α. Then, oil volume is determined by comparing the calculated α with its nominal value. The calculated oil volume is adjusted for temperature and oil volume loss is determined. If no oil loss is detected, the gas level algorithm is activated.

The gas level algorithm utilizes the measured gas pressure and gas temperature at a certain stroke to detect gas level. The measured gas pressure is adjusted according to the measured temperature to gain the resultant pressure at ambient. This value is compared to the expected pressure value using a calculation. The output of the calculation determines the gas level and can specify the quantity by which shock strut 12 is over- or under-pressurized.

Data logger 28 records the outputs of health monitor 26 for diagnostic and prognostic purposes. Oil volume and gas pressure for every landing event is recorded by data logger 28. Data logger 28 determines the leakage rate and predicts when shock strut 12 will require servicing. Data logger 28 can provide indications that servicing of oil and gas is required (based on the detection of oil loss by health monitor 26) or servicing of gas is required (based on the detection of gas loss by health monitor 26). For example, gas loss and oil volume loss in each landing can be calculated and logged, and oil volume loss and gas loss trend can be used to predict when servicing is required.

Theoretical and Experimental Basis.

It has been found during experiments that a shock strut transient gas pressure during landing in stroke domain is independent of its compression rate for compression rates above a certain threshold, and can be represented based on the following equation:

$$P_{gas}(s_2) = P_{gas}(s_1) \times \alpha(s_1, s_2, V_{oil}, \gamma) \qquad \text{Eq. 1}$$

in which $P_{gas}(s_2)$ and $P_{gas}(s_1)$ are the transient gas pressures at stroke $s_2$ and $s_1$ during landing, and $\alpha(s_1, s_2, V_{oil}, \gamma)$ is the transient pressure coefficient which depends on strokes, $s_1$ and $s_2$, oil volume, $V_{oil}$, and oil saturation state in fully extended position, $\gamma \cdot \alpha(0, s, V_{oil}, \gamma)$ is independent of gas pressure in fully extended position.

For the specific case where $s_1 = 0$ the above equation (Eq. 1) is rearranged as follows:

$$P_{gas}(s) = P_{gas}(0) \times \alpha(0, s, V_{oil}, \gamma) \qquad \text{Eq. 2}$$

where $P_{gas}(0)$ is the gas pressure in fully extended position. In a more general representation Eq. 2 is restated as follows:

$$P_{gas}(s_2) = P_{gas}(s_1) \times \frac{\alpha(0, s_2, V_{oil}, \gamma)}{\alpha(0, s_1, V_{oil}, \gamma)} \qquad \text{Eq. 3}$$

This equation for a shock strut with a certain amount of oil volume and oil saturation level in fully extended position is simplified as follows:

$$\frac{\alpha(0, s_2)}{\alpha(0, s_1)} = \frac{P_{gas}(s_2)}{P_{gas}(s_1)} \qquad \text{Eq. 4}$$

It was further found that although $\alpha(0, s, V_{oil}, \gamma)$ value is not affected by gas pressure in fully extended position, it is highly sensitive to oil volume.

Oil in fully extended position could be in any of the following saturation states:

Under-saturated: The amount of gas dissolved in oil is less than what is needed for saturation. Oil dissolves more gas over time to reach to the saturated state. This state only exists before the first landing when oil is freshly re-serviced in the shock strut.

Saturated: oil is in stable equilibrium with gas. No mass transfer takes place at gas/oil boundary. This state exists after takeoffs with fast extension rate specifically, for main landing gears in which extension rate is high enough to release all the extra gas dissolved in oil at high pressures in the preceding landing.

Over-saturated: The amount of gas dissolved in oil is more than oil capacity. Oil loses some gas over time to reach to the saturated state. For instance, this state exists after takeoffs with slow extension rates specifically for nose landing gear in which extension rate and, consequently, pressure drop rate is slow. As a result, oil does not release all the extra gas dissolved in it at high pressures in the preceding landing.

Thus, a shock strut gas pressure in fully extended position is dependent on the oil saturation state. Even for a properly serviced shock strut that has been re-serviced to compensate for the gas entrainment in oil, gas pressure will be less than the nominal value if oil is oversaturated due to a slow extension rate in the preceding takeoff.

Figure 2:
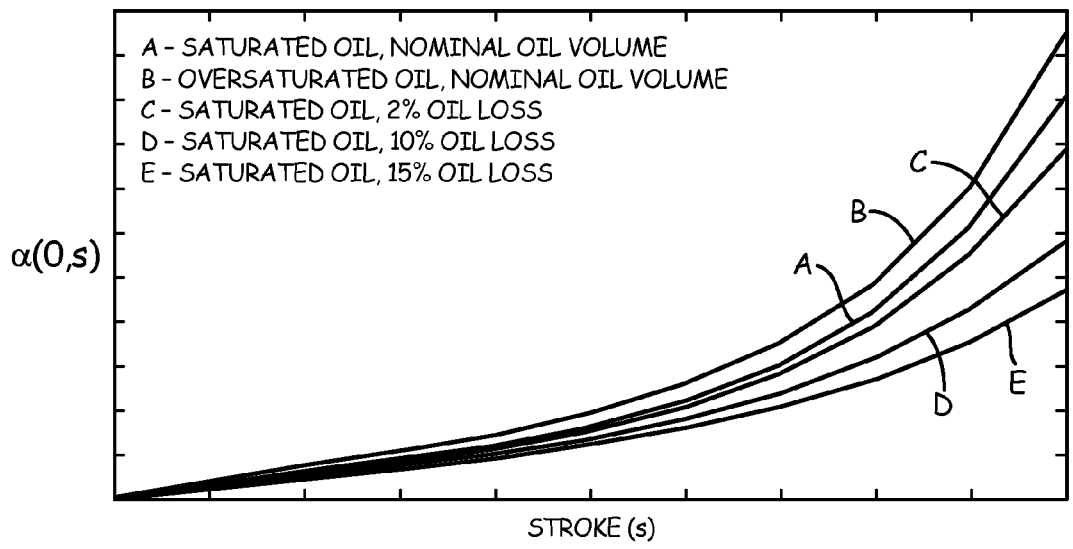
FIG. 2 is a graph of transient pressure coefficient $\alpha$ as a function of stroke s.

The reference or nominal $\alpha(0,s)$, called $\alpha_0(0,s)$ hereinafter, is obtained with the nominal volume of oil while oil is saturated with gas in fully extended position. It was found that, when oil is oversaturated in fully extended position, which occurs mostly for nose landing gear (NLG), $\alpha(0,s)$ increases above $\alpha_0(0,s)$. Since oil in a properly serviced shock strut can be either saturated or over-saturated, the calculated $\alpha(0,s)$ during landing is always bigger than or equal to $\alpha_0(0,s)$ for a serviced shock strut. With reference to FIG. 2, since $\alpha(0,s)$ is a nonlinear, increasing function of s, it can be concluded that $\alpha(s_1,s_2) = \alpha(0,s_2)/\alpha(0,s_1)$ is also always bigger than or equal to $\alpha_0(s_1,s_2)$ for a properly serviced shock strut. $\alpha_0(s_1,s_2)$ can be obtained experimentally for a properly serviced shock strut with saturated oil in fully extended position.

With reference to FIG. 2, $\alpha(0, s)$ drops below $\alpha_0(0,s)$ if oil volume is below the nominal value. In FIG. 2, even 2% oil loss, in a medium sized aircraft landing gear, causes $\alpha(0,s)$ to deviate from $\alpha_0(0,s)$ significantly. Since $\alpha(0,s)$ is a nonlinear, increasing function of s, it can be concluded that $\alpha(s_1,s_2) = \alpha(0,s_2)/\alpha(0,s_1)$ also falls below $\alpha_0(s_1,s_2)$ for an underserviced shock strut. Thus, comparing $\alpha(s_1,s_2)$ with $\alpha_0(s_1,s_2)$ reveals oil loss in a shock strut.

Figure 3:
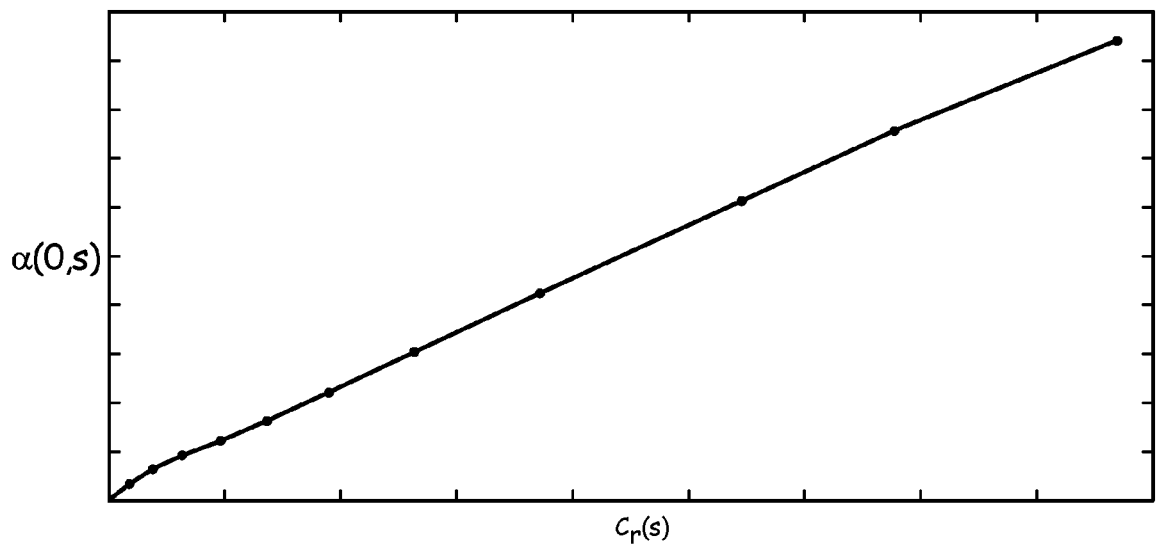
FIG. 3 is a graph of transient pressure coefficient $\alpha$ as a function of instantaneous compression ratio $C_r(s)$.

In addition, $\alpha(s_1,s_2)$ can also be used to quantify the oil loss. It was further found that $\alpha(0,s)$ is linearly dependent on the compression ratio at each stroke for a wide range of strokes FIG. 3, where compression ratio is defined as:

$$C_r(s) = V_{gas}(0)/V_{gas}(s) \qquad \text{Eq. 5}$$

where $V_{gas}(s)$ is the gas volume at stroke s. Thus, $$\alpha(s_1, s_2) = \frac{\alpha(0, s_2)}{\alpha(0, s_1)} = \frac{C_r(s_2)}{C_r(s_1)}. \qquad \text{Eq. 6}$$

where, $V_{gas,0}(0)$ and $V_{gas,0}(s)$ are the gas volumes at strokes 0 and s for a properly serviced shock strut. Thus, if $\alpha(s_1,s_2)$ is computed during landing, oil loss volume can also be estimated by calculating the change in the compression ratio.

Compression ratio is dependent on volume of oil loss as follows:

$$C_r(s) = \frac{\text{Volume availble to gas at 0''}}{\text{Volume availble to gas at s}} = \frac{V_{gas,0}(0) + V_{oil\,loss}}{V_{gas,0}(s) + V_{oil\,loss}} \qquad \text{Eq. 7}$$

where, $V_{gas,0}(0)$ and $V_{gas,0}(s)$ are the gas volumes at strokes 0 and s for a properly serviced shock strut. Thus, if $\alpha(s_1,s_2)$ is computed during landing, oil loss volume can also be estimated by calculating the change in the compression ratio.

Now based on these findings, the algorithm is devised as follows:

The algorithm receives 15 seconds of data associated to a landing event. First it ensures that the compression rate for the recorded landing event is bigger than a threshold value, that is defined for each shock strut experimentally, and $\alpha(s_1,s_2)$ can be compared with $\alpha_0(s_1,s_2)$ because it is not dependent on the compression rate. In the next step, transient gas pressure at two strokes are required to derive $\alpha(s_1,s_2)$. Thus, $\alpha(s_1,s_2)$ is calculated using the transient gas pressure during landing as follows:

$$\alpha(s_1, s_2) = \frac{P_{gas}(s_2)}{P_{gas}(s_1)} \qquad \text{Eq. 8}$$

where $s_1$ and $s_2$ are predefined strokes which are chosen for each shock strut with the aim to reduce the algorithm error.

In this stage oil loss volume is calculated using the deviation of $\alpha(s_1,s_2)$ from $\alpha_0(s_1,s_2)$ and by taking into account the oil thermal expansion/contraction:

$$V_{oil\,loss} = \frac{\alpha(s_1, s_2)V_{gas,0}(s_1)(V_{gas,0}(s_2) - V_{oil,0}\varepsilon(T_{oil} - 298)) - \alpha_0(s_1, s_2)V_{gas,0}(s_2)(V_{gas,0}(s_1) - V_{oil,0}\varepsilon(T_{oil} - 298))}{(1 + \varepsilon(T_{oil} - 298))\alpha_0(s_1, s_2)V_{gas,0}(s_2) - (1 + \varepsilon(T_{oil} - 298))\alpha(s_1, s_2)V_{gas,0}(s_1)} \qquad \text{Eq. 9}$$

where, $V_{oil\,loss}$ is the estimated oil volume loss, $V_{gas,0}(s)$ is nominal gas volumes at stroke s, $C_{r,0}(s)$ is the gas compression ratio at stroke s for the properly serviced shock strut, $T_{oil}$ is the oil temperature right before landing, $V_{oil,0}$ is the nominal oil volume at ambient temperature and $\varepsilon$ is the oil volumetric thermal expansion coefficient. Since $T_{oil}$ is not available (no temperature sensor on oil), it can be estimated using gas temperature knowing that gas and oil temperature are almost equal right before landing. Since gas temperature measurement has a slow dynamic, temperature measurement before landing or in fully extended position is not required. Thus, oil temperature before landing that is needed for oil volume loss determination (Eq. 9) can be estimated using the recorded gas temperature at stroke $s_1$ as follows:

$$T_{oil} \approx T_{gas}(s_1) \qquad \text{Eq. 10}$$

If oil loss volume is above a certain threshold percentage value then the shock strut needs to be serviced with both oil and gas. The threshold value is determined for each gear considering performance requirement, operational temperature envelope and etc. In that case, there is no need for running the gas level algorithm as full servicing is required. If the detected oil loss volume is below the threshold percentage value, the next step is to assess the gas level.

The gas level algorithm is activated if oil level is within the acceptable range. Since temperature measurement has a slow dynamic, recorded gas temperature during landing basically represents the gas temperature right before landing. Thus, gas pressure measured at stroke $s_2$ is adjusted for the gas temperature before landing based on the following equation:

$$P_{gas,adj}(s_2) = \frac{P_{gas}(s_2)}{T_{gas}(s_2)} \times 298[K]. \quad \text{Eq. 11}$$

Where $T_{gas}(s_2) \approx T_{gas}(0)$, The expected transient pressure at $s_2$ for a serviced shock strut is:

$$P_{gas,nominal}(s_2) = P_{gas,nominal}(0) \times \alpha_0(0, s_2) \quad \text{Eq. 12}$$

where $P_{gas,nominal}(0)$ is the nominal gas pressure in fully extended position and $\alpha_0(0, s_2)$ is determined experimentally for a properly serviced shock strut with saturated oil in fully extended position. If $$\left| \frac{P_{gas,nominal}(s_2) - P_{gas,adj}(s_2)}{P_{gas,nominal}(s_2)} \right|$$

which represents the gas loss is below a certain threshold then no servicing is required. Otherwise gas needs to be serviced.

Derivation of Eq. 9

Test results show that the transient pressure coefficient α is a linear function of compression ratio. Since compression ratio is dependent on oil volume, variations in compression ratio is used to determine the oil loss as follows. Equations 13 through 20 illustrate the equation progression to solve for Voil loss.

$$\frac{\alpha_0(s_1, s_2)}{\alpha(s_1, s_2)} = \frac{\frac{\alpha_0(0, s_2)}{\alpha_0(0, s_1)}}{\frac{\alpha(0, s_2)}{\alpha(0, s_1)}} = \frac{\frac{C_{r,0}(s_2)}{C_{r,0}(s_1)}}{\frac{C_r(s_2)}{C_r(s_1)}} = \frac{\frac{1}{V_{gas,0}(s_2)}}{\frac{1}{V_{gas,0}(s_1)}} \cdot \frac{\frac{1}{V_{gas,0}(s_2) + V_{oil,0} - (V_{oil,0} - V_{oil\,loss})(1+\varepsilon(T_{oil}-298))}}{\frac{1}{V_{gas,0}(s_1) + V_{oil,0} - (V_{oil,0} - V_{oil\,loss})(1+\varepsilon(T_{oil}-298))}} \quad \text{Eq. 13}$$

$$\frac{\alpha_0(s_1, s_2)}{\alpha(s_1, s_2)} = \frac{\frac{V_{gas,0}(s_1)}{V_{gas,0}(s_2)}}{\frac{V_{gas,0}(s_1) + V_{oil,0} - (V_{oil,0} - V_{oil\,loss})(1+\varepsilon(T_{oil}-298))}{V_{gas,0}(s_2) + V_{oil,0} - (V_{oil,0} - V_{oil\,loss})(1+\varepsilon(T_{oil}-298))}} \quad \text{Eq. 14}$$

$$\frac{\alpha_0(s_1, s_2)}{\alpha(s_1, s_2)} = \frac{\left( \frac{V_{gas,0}(s_2) + V_{oil,0} -}{(V_{oil,0} - V_{oil\,loss})(1+\varepsilon(T_{oil}-298))} \right) V_{gas,0}(s_1)}{\left( \frac{V_{gas,0}(s_1) + V_{oil,0} -}{(V_{oil,0} - V_{oil\,loss})(1+\varepsilon(T_{oil}-298))} \right) V_{gas,0}(s_2)} \quad \text{Eq. 15}$$

$$\frac{\alpha_0(s_1, s_2)}{\alpha(s_1, s_2)} = \frac{\left( \begin{array}{c} V_{gas,0}(s_2) - V_{oil,0}\varepsilon(T_{oil}-298) + \\ V_{oil\,loss}(1+\varepsilon(T_{oil}-298)) \end{array} \right) V_{gas,0}(s_1)}{\left( \begin{array}{c} V_{gas,0}(s_1) - V_{oil,0}\varepsilon(T_{oil}-298) + \\ V_{oil\,loss}(1+\varepsilon(T_{oil}-298)) \end{array} \right) V_{gas,0}(s_2)} \quad \text{Eq. 16}$$

$$\alpha_0(s_1, s_2)V_{gas,0}(s_2) \quad \text{Eq. 17}$$
$$(V_{gas,0}(s_1) - V_{oil,0}\varepsilon(T_{oil}-298) + V_{oil\,loss}(1+\varepsilon(T_{oil}-298))) =$$
$$\alpha(s_1, s_2)V_{gas,0}(s_1)$$
$$(V_{gas,0}(s_2) - V_{oil,0}\varepsilon(T_{oil}-298) + V_{oil\,loss}(1+\varepsilon(T_{oil}-298)))$$

$$\alpha_0(s_1, s_2)V_{gas,0}(s_2)(V_{gas,0}(s_1) - V_{oil,0}\varepsilon(T_{oil}-298)) + \quad \text{Eq. 18}$$
$$V_{oil\,loss}(1+\varepsilon(T_{oil}-298))\alpha_0(s_1, s_2)V_{gas,0}(s_2) =$$
$$\alpha(s_1, s_2)V_{gas,0}(s_1)(V_{gas,0}(s_2) - V_{oil,0}\varepsilon(T_{oil}-298)) +$$
$$V_{oil\,loss}(1+\varepsilon(T_{oil}-298))\alpha(s_1, s_2)V_{gas,0}(s_1)$$

$$V_{oil\,loss}(1+\varepsilon(T_{oil}-298))\alpha_0(s_1, s_2)V_{gas,0}(s_2) - \quad \text{Eq. 19}$$
$$V_{oil\,loss}(1+\varepsilon(T_{oil}-298))\alpha(s_1, s_2)V_{gas,0}(s_1) =$$
$$\alpha(s_1, s_2)V_{gas,0}(s_1)(V_{gas,0}(s_2) - V_{oil,0}\varepsilon(T_{oil}-298)) -$$
$$\alpha_0(s_1, s_2)V_{gas,0}(s_2)(V_{gas,0}(s_1) - V_{oil,0}\varepsilon(T_{oil}-298))$$

$$V_{oil\,loss} = \frac{\alpha(s_1, s_2)V_{gas,0}(s_1)(V_{gas,0}(s_2) - V_{oil,0}\varepsilon(T_{oil}-298)) - \alpha_0(s_1, s_2)V_{gas,0}(s_2)(V_{gas,0}(s_1) - V_{oil,0}\varepsilon(T_{oil}-298))}{(1+\varepsilon(T_{oil}-298))\alpha_0(s_1, s_2)V_{gas,0}(s_2) - (1+\varepsilon(T_{oil}-298))\alpha(s_1, s_2)V_{gas,0}(s_1)} \quad \text{Eq. 20}$$

Discussion of Possible Embodiments

The following are non-exclusive descriptions of possible embodiments of the present invention.

A method of monitoring condition of a shock strut based on sensed gas temperature, gas pressure, and stroke of the shock strut during a landing event; determining oil loss based upon a deviation of transient pressure coefficient derived from transient gas pressures at two different strokes from a nominal coefficient value; determining gas loss based upon temperature adjusted transient gas pressure at a selected stroke and a nominal gas pressure value at the selected stroke; and providing an output indicating need for service of the shock strut based upon the oil loss and the gas loss.

The method of the preceding paragraph can optionally include, additionally and/or alternatively, any one or more of the following features, configurations and/or additional components:

Sensing gas temperature, gas pressure, and stroke comprises sensing stroke of the shock strut; sensing transient gas temperature within the shock strut during landing to provide oil and gas steady state temperature values before landing; sensing a first shock strut transient gas pressure at a first stroke during a landing event; and sensing a second shock strut transient gas pressure at a second stroke during the landing event.

Determining oil loss comprises deriving a transient pressure coefficient based upon the first and second shock strut transient gas pressures; and calculating oil loss volume based on a deviation of the transient pressure coefficient from a nominal coefficient value.

Considering Oil thermal expansion/contraction for oil volume loss determination.

Calculating oil loss volume based on oil thermal expansion or contraction is performed using the gas temperature value during landing.

Determining gas loss comprises: if oil loss volume is within an acceptable range, adjusting the second transient gas pressure based on the gas temperature value; determining gas loss based upon the adjusted second transient gas pressure and a nominal second gas pressure value.

Providing an output comprises: providing an indication that the shock strut needs to be serviced for both oil and gas if oil loss volume exceeds an oil loss threshold, and providing an indication that the shock strut needs to be serviced for gas if gas loss is greater than a gas loss threshold.

A system for monitoring servicing condition of a shock strut includes a gas temperature sensor for sensing temperature of gas in the shock strut; a gas pressure sensor for sensing pressure of gas in the shock strut; a stroke sensor for sensing stroke of the shock strut; and a digital processor for determining whether the shock strut needs servicing. The digital processor includes a recorder, a landing detector, and a health monitor. The recorder acquires sensed gas temperature, gas pressure, and stroke data from the gas temperature sensor, the gas pressure sensor, and the stroke sensor over time, and stores the data in a data array. The landing detector determines occurrence of a landing event based upon stroke data in the data array. The health monitor determines oil loss and gas loss based upon the gas temperature, gas pressure, and stroke data from the data array during the landing event. The health monitor determines oil loss based upon a transient pressure coefficient derived from transient pressure data at two different strokes and the sensed gas temperature. The health monitor determines gas loss based on gas pressure at a selected stroke, the sensed gas temperature and an expected gas pressure value at the selected stroke.

The system of the preceding paragraph can optionally include, additionally and/or alternatively, any one or more of the following features, configurations and/or additional components:

The digital processor further includes, a data logger that records outputs of the health monitor for diagnostic and prognostic purposes.

The digital processor includes a counter that prevents the landing detector from receiving new array data for a time period following a landing event.

The landing detector determines occurrence of the landing event based upon maximum and minimum stroke data in the data array.

The health monitor provides an indication that the shock strut needs to be serviced for both oil and gas if the oil loss exceeds an oil loss threshold.

The health monitor determines gas loss if oil loss is within an acceptable range.

The health monitor provides an indication that the shock strut needs to be serviced for gas if gas loss is greater than a gas loss threshold.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of monitoring condition of a shock strut, the method comprising:
   sensing gas temperature, gas pressure, and stroke of the shock strut during a landing event;
   determining oil loss based upon a deviation of a transient pressure coefficient $\alpha(s_1,s_2)$ derived from a ratio of transient gas pressures $P_{gas}(s_1)/P_{gas}(s_2)$ at two different strokes $s_1, s_2$ from a nominal coefficient value $\alpha_0(s_1,s_2)$;
   determining gas loss based upon temperature adjusted transient gas pressure at a selected stroke and a nominal gas pressure value at the selected stroke; and
   providing an output indicating need for service of the shock strut based upon the oil loss and the gas loss.

2. The method of claim 1, wherein sensing gas temperature, gas pressure, and stroke comprises:
   sensing stroke of the shock strut;
   sensing gas temperature within the shock strut to provide gas and oil temperature values before landing;
   sensing a first shock strut transient gas pressure $P_{gas}(s_1)$ at a first stroke $s_1$ during a landing event; and
   sensing a second shock strut transient gas pressure $P_{gas}(s_2)$ at a second stroke $s_2$ during the landing event.

3. The method of claim 2, wherein determining oil loss comprises:
   deriving the transient pressure coefficient $\alpha(s_1,s_2)$ based upon a ratio the first and second shock strut transient gas pressures $P_{gas}(s_2)/P_{gas}(s_1)$;
   calculating oil loss volume based on a deviation of the transient pressure coefficient $\alpha(s_1,s_2)$ from the nominal coefficient value $\alpha_0(s_1,s_2)$.

4. The method of claim 3, wherein calculating oil loss volume is also based on oil thermal expansion or contraction.

5. The method of claim 4, wherein calculating oil loss volume based on oil thermal expansion or contraction is performed using the gas temperature value before landing.

6. The method of claim 3, wherein determining gas loss comprises:
   when oil loss volume is within an acceptable range, adjusting the second transient gas pressure based on the gas temperature value before landing; and
   determining gas loss based upon the adjusted second transient gas pressure and a nominal second gas pressure value.

7. The method of claim 6, wherein providing an output comprises:
   providing an indication that the shock strut needs to be serviced for both oil and gas when oil loss volume exceeds an oil loss threshold; and
   providing an indication that the shock strut needs to be serviced for gas when gas loss is greater than a gas loss threshold.

8. The method of claim 1, wherein providing an output comprises:
   providing an indication that the shock strut needs to be serviced based upon oil volume loss and gas loss trend data.

9. A system for monitoring condition of a shock strut, the system comprising:
   a gas temperature sensor for sensing temperature of gas in the shock strut;
   a gas pressure sensor for sensing pressure of gas in the shock strut;
   a stroke sensor for sensing stroke of the shock strut; and
   a digital processor for determining whether the shock strut needs servicing, the digital processor including:
      a recorder that acquires sensed gas temperature, gas pressure, and stroke data from the gas temperature sensor, the gas pressure sensor and the stroke sensor over time and stores the data in a data array;
      a landing detector that determines occurrence of a landing event based upon stroke data in the data array; and
      a health monitor that determines oil loss and gas loss based upon the gas temperature, gas pressure, and stroke data from the data array during the landing event; wherein the health monitor determines oil loss based upon a transient pressure coefficient $\alpha(s_1,s_2)$ derived from a ratio of transient pressure data $P_{gas}(s_2)/P_{gas}(s_1)$ at two different strokes $s_1$ and $s_2$, a nominal coefficient value $\alpha_0(s_1,s_2)$ and the sensed gas temperature; and determines gas loss based on gas pressure at a selected stroke, the sensed gas temperature and an expected gas pressure value at the selected stroke.

10. The system of claim 9, wherein the digital processor further includes:
 a data logger that records outputs of the health monitor for diagnostic and prognostic purposes.

11. The system of claim 9, wherein the digital processor further includes:
 a counter that prevents the landing detector from receiving new array data for a time period following a landing event.

12. The system of claim 9, wherein the landing detector determines occurrence of the landing event based upon maximum and minimum stroke data in the data array.

13. The system of claim 9, wherein the health monitor provides an indication that the shock strut needs to be serviced for both oil and gas when the oil loss exceeds an oil loss threshold.

14. The system of claim 9, wherein the health monitor determines gas loss when oil loss is within an acceptable range.

15. The system of claim 9, wherein the health monitor provides an indication that the shock strut needs to be serviced for gas when gas loss is greater than a gas loss threshold.

* * * * *